P. G. SEWARD.
VEHICLE TIRE.
APPLICATION FILED MAR. 2, 1911.
1,004,481.
Patented Sept. 26, 1911.
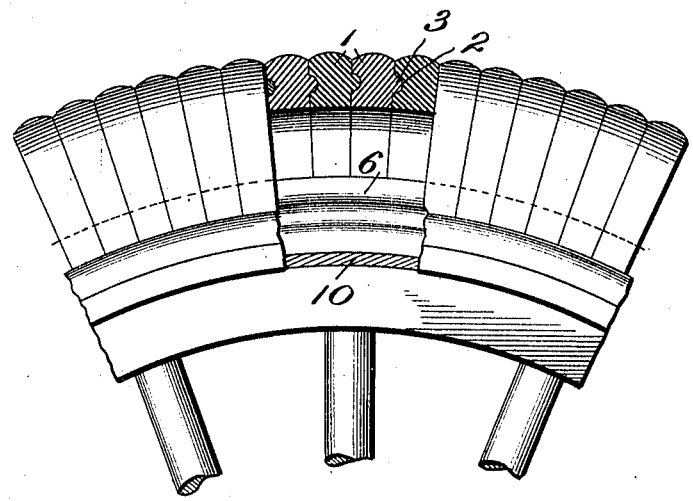
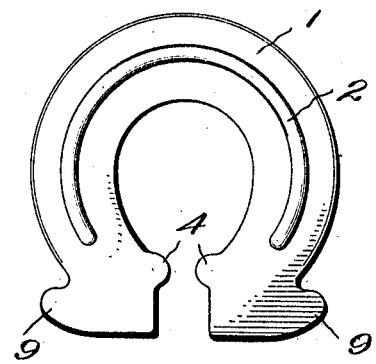
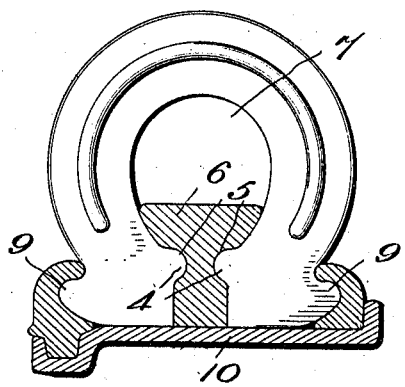
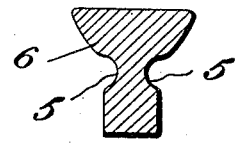
Witnesses
Geo. H. Byrne.
Byron B. Collings.
Inventor
Percy G. Seward, by
Wickinson Fisher &
Witherspoon
Attorneys

UNITED STATES PATENT OFFICE.

PERCY G. SEWARD, OF PETERSBURG, VIRGINIA, ASSIGNOR TO SEWARD RUBBER TIRE COMPANY, INC., OF PETERSBURG, VIRGINIA, A CORPORATION OF VIRGINIA.

VEHICLE-TIRE.

1,004,481.  Specification of Letters Patent.  Patented Sept. 26, 1911.

Application filed March 2, 1911. Serial No. 611,916.

*To all whom it may concern:*

Be it known that I, PERCY G. SEWARD, a citizen of the United States, residing at Petersburg, in the county of Dinwiddie and State of Virginia, have invented certain new and useful Improvements in Vehicle-Tires; and I do hereby declare the following to be a full, clear, and exact description of the invention, such as will enable others skilled in the art to which it appertains to make and use the same.

This invention relates to vehicle tires, and has for its object to produce a resilient tire having all of the qualities of a pneumatic tire, but not subject to the disadvantages incident to puncture.

A further object of the invention is to produce a tire made up of independent resilient sections interlocked with each other, and inclosing a hollow space, the said sections being capable of ready removal and replacement, and the said tire being capable of being readily detached from the wheel rim as a whole with the same facility that pneumatic tires are now manipulated.

With these and other objects in view, the invention consists in the novel details of construction and combinations of parts more fully hereinafter disclosed and particularly pointed out in the claims.

Referring to the accompanying drawings forming a part of this specification in which like numerals designate like parts in all the views, Figure 1 is an elevational view, partly in section, of a portion of a tire made in accordance with my invention, and attached to the wheel; Fig. 2 is a sectional view of the parts shown in Fig. 1; Fig. 3 is an elevational view of one of the tire sections detached from the tire; and Fig. 4 is a sectional view of a rim for securing the said tire sections together.

1 indicates a plurality of resilient independent tire sections preferably made of rubber, and provided on one of their faces with a groove 2 and on the opposite face with a projection or tongue 3 adapted to fit into the groove 2 of a contiguous section when in place on the tire. Each of the sections is also preferably provided with holding lugs 4 adapted to fit into corresponding grooves 5 in the rim 6 which extends around the circumference of the wheel rim proper and serves to hold the sections 1 together. 7 represents a hollow space which is inclosed by the said sections 1 and the rim 6, and permits the ready distortion of the tread of the tire in order to conform to the unevennesses of the ground. Each of the said sections is also preferably provided with means such as the feet or lugs 9 to enable the said tire to be readily attached to and detached from the real wheel rim 10, as will be readily understood.

This invention differs from the tire disclosed in my co-pending application No. 597,963, filed December 17, 1910, among other things, in that it provides a tongue and groove connection between the individual sections 1, and it also involves a wheel rim 6 which is preferably independent of the real wheel rim 10.

Of course it is obvious that those skilled in the art may vary the details of construction and arrangements of parts without departing from the spirit of my invention, and therefore, I do not wish to be limited to such features except as may be required by the claims.

What I claim is:—

1. A vehicle tire comprising a plurality of independent resilient U-shaped sections having interlocking tongue and groove connections and projecting holding lugs, a rim independent of the vehicle wheel having grooves into which said lugs fit, and means for securing said rim and sections to the wheel, substantially as described.

2. A vehicle tire comprising a plurality of independent U-shaped resilient sections of rubber each provided with a tongue on one face and a groove on its other face, the said tongues and grooves of contiguous sections fitting each other and each having a pair of holding lugs, and a rim independent of the wheel having grooves into which said lugs fit, substantially as described.

In testimony whereof, I affix my signature, in presence of two witnesses.

PERCY G. SEWARD.

Witnesses:
T. A. WITHERSPOON,
L. H. WEAVER.

Copies of this patent may be obtained for five cents each, by addressing the "Commissioner of Patents, Washington, D. C."